United States Patent [19]

Friedli et al.

[11] 4,387,182
[45] Jun. 7, 1983

[54] CYCLOALIPHATIC ACRYLATE COMPOSITIONS

[75] Inventors: Hans R. Friedli; Donald L. Nelson; John L. Massingill, Jr., all of Lake Jackson, Tex.

[73] Assignee: The Dow Chemical Co., Midland, Mich.

[21] Appl. No.: 268,445

[22] Filed: May 29, 1981

Related U.S. Application Data

[60] Division of Ser. No. 951,416, Oct. 13, 1978, Pat. No. 4,319,009, which is a continuation of Ser. No. 866,679, Jan. 3, 1978, abandoned.

[51] Int. Cl.³ .................... C08L 63/00; C08G 63/76; C08F 232/00; C08L 67/00
[52] U.S. Cl. .................... 525/44; 525/107; 525/112; 525/170; 525/530; 525/531; 525/922; 526/62; 526/237; 526/282; 526/284
[58] Field of Search .................... 525/31, 39, 44, 107, 525/112, 290, 530, 531, 910, 922, 170; 526/62, 237, 282, 284

[56] References Cited

FOREIGN PATENT DOCUMENTS 1954548 5/1971 Fed. Rep. of Germany.

*Primary Examiner*—John C. Bleutge
*Assistant Examiner*—Herbert J. Lilling
*Attorney, Agent, or Firm*—B. G. Colley

[57] ABSTRACT

Cycloalphatic acrylate compositions and methods of making them are disclosed. The compositions are mixtures containing dicyclopentadiene (meth) acrylate and (meth) acrylates such as the mono and di (meth) acrylates of tri, and tetracyclopentadiene and a mixture of the copolymers of (meth) acrylic acid with adducts of cyclopentadiene with isoprene and/or piperylene and a mixture of poly (meth) acrylates having the repeating unit

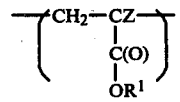

where
$R^1$ is hydrogen or

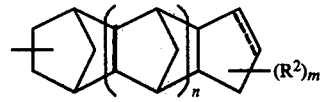

$R^2$ is $CH_2=CZ-C(O)-O-$
Z is H, or methyl
n is 0, 1 or 2 and
m is 0 or 1 and when m is 0 there is a double bond present.

The compositions are useful to make cross-linkable blends with unsaturated resins or monomers and to make laminates.

2 Claims, No Drawings

CYCLOALIPHATIC ACRYLATE COMPOSITIONS

This application is a divisional application of Ser. No. 951,416, filed Oct. 13, 1978, U.S. Pat. No. 4,319,009, March 9, 1982 which is a continuation-in-part of Ser. No. 866,679, filed Jan. 3, 1978, now abandoned.

BACKGROUND OF THE INVENTION

This invention relates to a cycloaliphatic acrylate composition containing mixtures of dicyclopentadiene (meth) acrylate, acrylates which comprise the mono and di (meth) acrylates of tri, and tetracyclopentadiene, copolymers of acrylic acid or methacrylic acid with adducts of cyclopentadiene with isoprene and/or piperylene, and a mixture of polyacrylates having the repeating unit

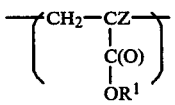

Where
$R^1$ is hydrogen or

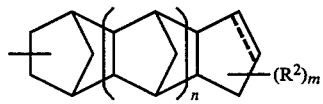

$R^2$ is $CH_2=CZ-C(O)-O-$
Z is H, or methyl
n is 0, 1 or 2
m is 0 or 1 and when m is 0 there is a double bond present.

The invention also encompasses thermosetting resin compositions containing the acrylate composition.

Dicyclopentadiene acrylate (DCPDA) is known from U.S. Pat. No. 2,414,089 dated Jan. 14, 1947.

It is known from British Pat. No. 1,114,585; Modern Plastics, September 1976, pages 95–103; Rubber World, June 1974, page 42 and German Pat. No. 1,234,027 that a distilled or a substantially pure dicyclopentadiene acrylate can be used alone or blended with other unsaturated monomers to make thermoplastic polymers, rubbers, or for crosslinking unsaturated polyesters.

The use of distilled dicyclopentadiene alkenoate concentrate to cure or crosslink vinyl ester resins and polyester resins is known from Ser. No. 814,358 and Ser. No. 814,359 both filed on July 11, 1977.

According to U.S. Pat. No. 2,414,089 (49), DCPDA can be prepared by esterification of dicyclopentadienyl alcohol or dicyclopentadiene (DCPD), or by ester exchange. Recovery of pure DCPDA is accomplished by dilution of the crude reaction mixture to reduce viscosity and density, washing with basic solutions and water, removal of diluent and distillation under high vacuum. In Brit. Pat. No. 1,114,585 (68) and U.S. Pat. No. 3,427,363 (60) specific examples are given for the preparation of pure DCPDA. The yield of DCPDA based on DCPD does not exceed 86.6%. German Pat. No. 1,954,548 (71) addresses itself to solving a specific problem of the general process, namely the elimination of emulsion formation during work-up.

While DCPDA has been known for over 30 years, no significant commercial use has developed because the cost of production has been prohibitive for most uses. The reason for the high cost is the requirement for a distilled product free of difunctional compounds and polymers for thermoplastic polymer applications and for a low-colored product for thermoset uses. Distillation of DCPDA is difficult because of the high reactivity of the acrylate bond and the propensity to crosslink of the cyclopentene double bond, and because of the high boiling point of 280° C./760 MM Hg or 100° C./1.7 MM Hg. Even with well inhibited systems, distillations are limited to about 120° C. Furthermore, the polymers formed during the process and during distillation are difficult to handle because they are partially crosslinked or gelled.

SUMMARY OF THE INVENTION

The cycloaliphatic acrylate composition of this invention comprises (A) about 60 to 95 percent by weight of dicyclopentadiene acrylate, methacylate, or mixtures thereof, (B) about 2 to 15 percent by weight of a mixture of polycyclopentadienyl acrylates of the formula

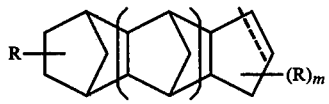

where
R is $CH_2=CZC(O)-O-$
Z is H, or methyl
n is 1, or 2
m is 0 or 1 and when m is 0 there is a double bond present (C) about 1 to about 21 percent by weight of a mixture of the copolymers of methacrylic acid or acrylic acid with adducts of cyclopentadiene with isoprene, piperylene, or mixtures thereof, (D) about 0.05 to about 10 percent by weight of a mixture of polyacrylates having the repeating unit

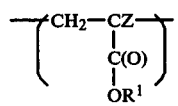

where
$R^1$ is hydrogen or

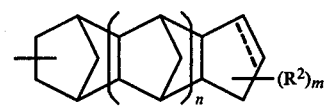

$R^2$ is $CH_2=CZ-C(O)-O$
Z is H, or methyl,
n is 0, 1, or 2, and
m is 0, or 1 and when m is 0 there is a double bond present.

Preferably the range of dicyclopentadiene (meth) acrylate is from 71 to 91 percent by weight.

Preferably, the acrylate mixture range is from 9 to 12 percent by weight.

Preferably, the copolymer range is from 5 to 15 percent by weight while the polyacrylate range is from 0.1 to 2 percent by weight.

There are also residual or trace amounts of unreacted monomeric components in the composition such as about 0.2 percent by weight of DCPD and 0-2 percent by weight of acrylic acid or methacrylic acid.

The compositions of this invention are useful to crosslink unsaturated resins. The compositions are easy to produce with high conversion of the raw materials. They do not require purification by distillation and are equal to or superior in performance as compared to distilled DCPDA.

DESCRIPTION OF THE PREFERRED EMBODIMENTS

The reactants used to make the compositions of this invention are acrylic or methacrylic acid, and dicyclopentadiene (DCPD). DCPD can be used in the form of the pure compound or as a DCPD concentrate containing DCPD and 2-30% of the codimers (Diels-Alder adduct) of cyclopentadiene with isoprene, piperylene, or methylcyclopentadiene. Light and heavy components in the concentrate such as $C_5$ olefins, $C_5$ diolefins, $C_5$ paraffins, tricyclopentadiene and dicyclopentadiene are preferably kept below 2%, although the light components such as the $C_5$ hydrocarbons can be as high as 7-10%.

The compositions of this invention can be prepared in stainless steel equipment by the addition of inhibited DCPD to inhibited acrylic acid (AA) or methacrylic acid (MAA) containing $BF_3$ catalyst. The reaction temperature is controlled to less than 70° C. and 0.1 to 4.0 molar excess of AA is used. Formation of emulsions during the subsequent wash process is prevented by keeping all exposed metal surfaces wetted with the inhibited reaction product by using a spray nozzle and a recirculation pump. The effectiveness of the inhibitor (methyl ether of hydroquinone) is maintained by using 1-5% and preferably 2% oxygen in the nitrogen pad. Care must be exercised not to exceed 5% oxygen since above this amount there is danger of explosions.

The above compositions can be produced in a continuous flow reactor. Inhibited acrylic acid or methacrylic acid is reacted with DCPD or DCPD concentrate in a molar ratio of 1:2 to 5:1 in the presence of 0.5-2.0 weight % $BF_3$ catalyst based on a total amount of AA or MAA and DCPD. The reaction temperature is controlled in the range of 100°-150° C. and preferably 110°-130° C. with a residence time of 5 to 10 minutes. The pressure is kept such that liquid phase is maintained, i.e. 30-100 psig. The main variables, catalyst concentration, temperature and residence time, are interdependent and can be chosen such that complete or essentially complete DCPD conversion is obtained.

Following the addition reaction, the products are separated under vacuum in a falling film stripper into an overhead product consisting predominantly of AA or MAA and the corresponding $BF_3$ complex which is recycled, and a bottom product essentially free of acrylic acid and boron which is then water-washed 3-5 times at 50°-90° C. to give a wet product which is then dried to give the finished product.

The compositions prepared herein are useful to make crosslinked polymers alone or in combination with unsaturated monomers or unsaturated resins.

Examples of unsaturated monomers which are polymerizable with the present compositions are acrylates and haloacrylates, vinyl aromatics such as styrene, alpha methyl styrene, halo styrenes, vinyltoluene, divinyl benzene, and the like, allyl compounds such as diallyl phthalate or allyl alcohol, olefins such as butene and diolefins such as butadiene, as well as halogenated olefins and vinyl cyanide.

Examples for unsaturated resins which are polymerizable with the present compositions are unsaturated polyester resins, vinylester resins as described in U.S. Pat. Nos. 3,367,992, 3,564,074 and 3,594,247, polybutadiene and polyisoprene, styrene/butadiene copolymers and the like.

Polymerization is accomplished by a free radical mechanism i.e. using free radical catalysts, including initiation by electron and ultraviolet irradation.

The above thermosetting resins are blended with an ethylenically unsaturated monomer mixture copolymerizable with the unsaturated polymers. The mixture comprises vinyl aromatic monomers such as styrene, alphamethyl styrene, chlorostyrene, vinyl toluene, divinyl benzene, and diallyl phthalate with about 5 to about 90 weight percent of cycloaliphatic acrylate concentrate.

The thermosetting resins blends with the unsaturated monomer mixture should contain 20 to about 70 percent by weight and preferably 30 to 50 percent by weight of the monomer mixture based on the weight of the resin. A small amount of inhibitor such as tertiary butyl catechol, hydroquinone, or the like is added to this mixture. The amount added is generally in the range from about 50-300 parts per million based on the amount of unsaturated monomer.

The final blend is a crosslinkable resin composition which is useful to make laminates.

Laminates are made by mixing into the crosslinkable composition free radical forming catalysts and adding this mixture to a suitable fibrous substrate such as asbestos fibers, carbon fibers, fibrous glass, or inorganic fibers. Examples of these catalysts are benzoyl peroxide, tertial butyl peroxide, methylethylketone peroxide and the like. It is also of value to add accelerators such as cobalt naphthenate, dimethyl aniline, and the like.

The cross linkable composition is rolled, sprayed or impregnated into the fibrous reinforcement such as fibrous glass and cured in a manner well known in the art. When fibrous glass is used, it can be in any form such as chopped strands, filaments, glass ribbons, glass yarns, or reinforcing mats.

The following examples are presented to illustrate but not limit the invention.

EXAMPLE 1

Glacial acrylic acid (AA) containing 0.1% methylether of hydroquinone (MEHQ) inhibitor and borontrifluoride etherate catalyst were premixed in a stainless steel feed tank and pumped with a metering pump to a mixing tee where they were combined with a metered stream of dicyclopentadiene (DCPD) inhibited with tertiary butyl catechol. This feed mixture was preheated and converted in a jacketed $\frac{3}{8}''$ O.D.$\times 0.035''$ walls$\times 35''$ length reactor tube made of stainless steel. The reaction temperature was maintained by controlling the jacket temperature. The reaction pressure was controlled at 30-60 psig to maintain liquid phase. Steady state conditions were reached in 15-30 minutes. The effluent from the flow reactor was fed via a letdown valve to a falling film stripper column of $\frac{1}{2}''$ O.D.$\times 0.035''$ wall$\times 46''$ length. The feed was distributed to the stripper wall via a slotted weir. The stripper temperature was controlled with a steam heated jacket and the pressure was reduced with a vacuum pump outfitted with a pressure regulator. In the stripper, predominantly acrylic acid/BF$_3$ complex and acrylic acid are removed overhead through a rectification/demister section. Overheads and bottoms were cooled and collected for mass balance and analysis.

The reactor was fed at a rate of 3.24 ml/min with a glacial acrylic acid/BF$_3$ etherate mixture (2.53% BF$_3$ etherate) and with 3.19 ml/min DCPD (96% pure DCPD). This corresponds to a 2/1 molar ratio of acrylic acid to DCPD and 0.6% BF$_3$ based on total feed. Temperatures in the reactor and stripper were 120° C. The pressure in the stripper was 5 mm Hg. The residence time in the reactor was eight minutes, and about two minutes in the stripper.

During a 2.5 hour period of continuous run, the following qunatities were fed and recovered:

| Feed | | Product | |
|---|---|---|---|
| AA + BF$_3$ Et$_2$O | 903.70 g | Bottom Product | 1248.98 g (72.7%) |
| DCPD | 823.80 g | Overhead Product | 469.81 g (27.3%) |
| Total | 1727.50 g | Total | 1718.79 g |

706.4 of the stripper bottoms were placed in a one gallon glass bottle, stirred and heated to 70° C. 689.6 g of 70° C. deionized water were added and the mixture was stirred for five minutes. Excellent phase separations were obtained with separation times of 3 to 3.5 minutes. The washing was repeated three times and 689 g of wet dicyclopentadiene acrylate concentrate were obtained. This material was dried in a two liter flask equipped with a magnetic stirring bar at room temperature at 12 mm Hg. Loss was 13.65 g or 1.98% giving 675.35 g of a bright clear liquid with the following properties:

| Gardner color | 6-7 |
|---|---|
| Viscosity | 22 cps (24° C.) |
| Boron | 2 ppm |
| Dicyclopentadiene acrylate (DCPDA) | 83.6% |
| Polycyclopentadienyl acrylates | 12.6% |
| Copolymers of acrylic acid | 1.0% |
| Polyacrylates | 2.8% |

Similar results are obtained when the acrylic acid is replaced with methacrylic acid.

EXAMPLE 2

Using the identical procedure and conditions, but using a DCPD concentrate as feedstock the following results were obtained:

| Conversions | 99.7% (based on DCPD) |
|---|---|
| Gardner color | 9-10 |
| Viscosity | 63.9 cps (24° C.) |
| Dicyclopentadiene acrylate (DCPDA) | 72.7% |
| Polycyclopentadienyl acrylates | 10.2% |
| Copolymers of acrylic acid | 14.0% |
| Polyacrylates | 3.0% |

The above dicyclopentadiene concentrate contained 84% DCPD, 13% dimers of cyclopentadiene with isoprene, piperylene, etc., and 2% tricyclopentadiene and tetracyclopentadiene.

EXAMPLE 3

237.6 pounds of dicyclopentadiene (DCPD) (97% pure DCPD) were inhibited with 238 g of methylether of hydroquinone (MEHQ) dissolved in 900 g acrylic acid. 194.4 pounds of glacial acrylic acid containing 0.1% MEHQ inhibitor were loaded into a stirred 100-gallon stainless steel reactor and mixed with 2476 g of BF$_3$ etherate. The empty space in the reactor was filled with 2% O$_2$ in nitrogen at 2-5 parts. All exposed metal surfaces were kept wetted with inhibited reaction mixture or by an internal spray system. 11.0 pounds of the inhibited DCPD were added to the kettle and the temperature increased to 40° C. After analysis showed that the reaction had started, the DCPD was added at a rate of about 25 pounds/hour (9.6 hrs) at 50°-60° C. After all DCPD was added, the reaction was completed at 70° C. in 3.2 hours. Unreacted acrylic acid, catalyst, and color bodies were removed by five washes with 50-65 gallons of water at 70° C. The washed material was dried for three hours until the kettle conditions were 69° C. and 33 mm Hg. The product was cooled, drummed, and the MEHQ concentration adjusted to 190 ppm. 363 pounds of cycloaliphatic composition were obtained. The yield on DCPD is 98.8%. The product has the following characteristics:

| Gardner Color | 3-4 |
|---|---|
| Viscosity | 16.7 cps (at 24° C.) |
| Boron | 5.6 ppm |
| Dicyclopentadiene acrylate (DCPDA) | 87.7% |
| Polycyclopentadienyl acrylate | 11.2% |
| Copolymers of acrylic acid | 0.9% |
| Polyacrylates | 0.2% |

Control 1

An identical experiment to example 3 was performed but without oxygen in the nitrogen pad and without an internal spray. This resulted in a product containing polyacrylic acid and it formed severe emulsions upon washing with hot water which could not be broken in a coalescer.

EXAMPLE 4

Resin blends with a commercial vinyl ester resin identified as Derakane 411 were prepared as follows:

| | Wt. % | | |
|---|---|---|---|
| | A | B | C |
| Derakane 411 | 55 | 55 | 55 |
| Styrene | 45 | 36 | 27 |
| CAC | — | 9 | 18 |

The above CAC symbols indicate a cycloaliphatic acrylate composition having the following approximate analysis in percent by weight

| Dicyclopentadiene acrylate | 81.0 |
|---|---|
| Polycyclopentadienyl acrylate | 9.3 |
| Copolymers of acrylic acid | 1.0 |
| Polyacrylates | 8.0 |

The cure systems used for the respective resins were:

|  | Wt. % | | |
| --- | --- | --- | --- |
|  | A | B | C |
| MEK peroxide | 1.0 | 1.5 | 1.5 |
| Cobalt Naphthenate 6% | 0.1 | 0.2 | 0.2 |
| Dimethylaniline | 0.1 | 0.15 | 0.2 |
| Gel time, (min.) | 17.7 | 17.4 | 18.6 |

All resin blends were adjusted to the same gel time. The extra promoter and catalyst requirements for Samples B and C is due to higher concentration of MEHQ (methyl ether of hydroquinone).

Glass laminates were prepared using a normal hand lay-up technique. The finished laminates contained 75% resin and 25% fiber glass. The monomer loss of the laminates, recorded over time, was:

TABLE 9

| Minutes | % | | |
| --- | --- | --- | --- |
|  | A | B | C |
| 5 | — | 0.9 | 0.6 |
| 10 | — | 2.0 | 1.2 |
| 15 | 2.6 | 2.8 | 1.7 |
| 20 | — | 3.5 | 2.3 |
| 25 | — | 3.5 | 2.6 |
| 30 | 4.4 | — | 2.6 |
| 45 | 4.8 | — | — |
| 60 | 4.8 | — | — |

The above data shows that the monomer loss stopped sooner with the CAC system than the all-styrene system. The monomer loss reduction was 27% for resin B and 46% for resin C.

The hardness development rates for the respective laminates are:

| Time | Barcol Hardness | | |
| --- | --- | --- | --- |
|  | A | B | C |
| 30 min. | — | 42 | 15 |
| 1 hr. | 7 | 43 | 28 |
| 2 hr. | 14 | 44 | 35 |
| 4 hr. | 18 | 43 | 37 |
| 6 hr. | 21 | 44 | 39 |
| 8 hr. | 23 | 43 | 39 |
| 1 day | 26 | 44 | 40 |
| 2 days | 32 | 44 | 42 |
| 3 days | 32 | 46 | 42 |

The above data shows that the compositions of this invention can be effectively used to accelerate the hardness development of vinyl ester resins.

EXAMPLE 5

The resin blends of example 4 were repeated using pure distilled dicyclopentadiene acrylate, i.e. monomer grade (MG). The results of the Barcol Hardness test is shown below comparing the results of the cycloaliphatic acrylate compositions CAS with the pure distilled dicyclopentadiene acrylate (MG).

| Time | Barcol Hardness | | | | |
| --- | --- | --- | --- | --- | --- |
|  | A | B | | C | |
|  |  | CAC | MG | CAC | MG |
| 30 min. | — | 42 | — | 15 | — |
| 45 min. | — | — | 30 | — | 16 |
| 1 hr. | 7 | 43 | 32 | 28 | 21 |
| 2 hr. | 14 | 44 | — | 35 | — |
| 4 hr. | 18 | 43 | — | 37 | — |
| 5 hr. | — | — | 33 | — | 29 |

The above data shows that the compositions of this invention was superior to the pure DCPA acrylate in accelerating the hardness development of vinyl ester resins.

EXAMPLE 6

An unsaturated polyester resin was made up of 0.4 mol maleic anhydride, 0.6 moles phthalic anhydride, and 1.1 mol propylene glycol was cooked for two hours to a temperature of 140° C. The temperature was increased to 170° C. for one hour, then it was increased to 200° C. for the remainer of the cook cycle until an acid number of 30–35 was achieved; 100 ppm hydroquinone was added with the temperature of the resin at 150° C. The resin was poured out and allowed to cool to room temperature.

Resin blends were made with this general purpose polyester resin as follows:

|  | A | B |
| --- | --- | --- |
| Polyester resin | 55 wt. % | 55 wt. % |
| Styrene | 45 | 33.8 |
| CAC | — | 11.2 |

The above cycloaliphatic acrylate composition (CAC) was prepared as in Example 3.

The cure systems used for the respective resins were:

|  | A | B |
| --- | --- | --- |
| Cobalt Naphthanate | 0.1% | 0.1% |
| n,n,-Dimethylaniline | 0.1 | 0.1 |
| p-Benzoquinone | 0.048 | 0.026 |
| MEK Peroxide | 1 | 1 |
| Gel time (min.) | 17.4 | 17.4 |

Glass laminates were prepared by using 2-ply fiber glass. The finished laminates contained 75% resin and 25% glass. The monomer weight loss of the laminates was recorded over time.

| Time (min.) | A | B |
| --- | --- | --- |
| 10 | 3.06 | 2.93 |
| 15 | 3.99 | 3.62 |
| 20 | 5.26 | 4.74 |
| 25 | 6.39 | 5.44 |
| 30 | 7.52 | 6.20 |
| 45 | 9.38 | 7.25 |
| 60 | 9.58 | 7.25 |
| 75 | 9.71 | 7.25 |
| 90 | 9.71 | 7.25 |

The monomer loss was decreased and the time was shortened in resin B when CAC was present. The monomer loss reduction was 25% for resin B.

The Barcol hardness development rates for the respective laminates are:

| Time (hrs.) | A | B |
| --- | --- | --- |
| 1 | 0 | 11 |
| 2 | 6 | 19 |
| 3 | 14 | 25 |
| 4 | 23 | 26 |
| 5 | 23 | 28 |
| 6 | 26 | 33 |
| 7 | 29 | 33 |
| 8 | 30 | 36 |
| 24 | 35 | 40 |

The above data shows that the composition of this invention can be effectively used to accelerate the hardness development of general purpose polyester resins.

EXAMPLE 7

A commercially available ultraviolet light curable vinyl ester resin (Bis phenol A-Epoxy-Acrylic resin) was blended with an equal weight of the CAC used in Example 4. As a photoinitiator, 3% by weight of diethoxyacetophenone was blended into the mixture. The sample was coated on a steel panel and passed under a 200 watt per linear inch ultraviolet lamp at a fixed speed of 100 feet per minute. After about 15 passes, a hard mar-free coating was obtained.

We claim:

1. A thermosetting resin composition which comprises:
   (1) an unsaturated polyester resin, and
   (2) an unsaturated monomer mixture of a vinyl aromatic monomer and a cycloaliphatic acrylate composition comprising
   (A) about 60 to 95 percent by weight of dicyclopentadiene acrylate, methacrylate, or mixtures thereof
   (B) about 2 to 15 percent by weight of a mixture of polycyclopentadienyl acrylates of the formula

where
R is $CH_2=CZ-C(O)-O-$
Z is H, or methyl
n is 1, or 2
m is 0 or 1 and when m is 0 there is a double bond present
   (C) about 1 to about 21 percent by weight of a mixture of the copolymers of methacrylic acid or acrylic acid with adducts of cyclopentadiene with isoprene, piperylene, or mixtures thereof,
   (D) about 0.05 to about 10 percent by weight of a mixture of poly acrylates having the repeating unit

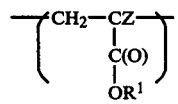

where $R^1$ is hydrogen or

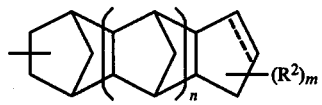

$R^2$ is $CH_2=CZ-C(O)-O-$
Z is H or methyl
n is 0, 1 or 2, and
m is 0 or 1 and when m is 0 there is a double bond present.

2. A cured fibrous laminate made with the composition of claim 1.

* * * * *